United States Patent [19]
Landsman

[11] 3,961,132
[45] June 1, 1976

[54] SEQUENTIAL IMAGE-MODULATED DOT-AREA RECORDING

[75] Inventor: Robert M. Landsman, Norwalk, Conn.

[73] Assignee: Log Etronics Inc., Springfield, Va.

[22] Filed: July 15, 1974

[21] Appl. No.: 488,389

[52] U.S. Cl. .......................... 178/6.7 R; 178/6.6 B
[51] Int. Cl.² ...................... H04N 1/40; H04N 5/84; H04N 3/00
[58] Field of Search............ 178/6.7 R, 6.6 B, 7.1 E, 178/7.3 D, 7.5 D, DIG. 27, 7.4; 358/77, 78, 79; 315/30

[56] References Cited
UNITED STATES PATENTS

| | | | |
|---|---|---|---|
| 2,962,548 | 11/1960 | Taudt.............................. | 178/6.6 B |
| 3,465,199 | 9/1969 | Simshauser...................... | 178/6.7 R |
| 3,646,262 | 2/1972 | Moe................................. | 178/6.7 R |
| 3,681,650 | 8/1972 | Koll................................. | 178/6.7 R |
| 3,742,129 | 6/1973 | Roberts et al.................... | 178/6.7 R |
| 3,811,009 | 5/1974 | Fukumoto et al. .............. | 178/7.3 D |
| 3,816,659 | 6/1974 | Landsman...................... | 178/7.1 E |

Primary Examiner—Alfred H. Eddleman
Attorney, Agent, or Firm—William D. Hall

[57] ABSTRACT

Continuous-tone original picture information, such as a photograph or original art work, is put into a form suitable for halftone printing reproduction by raster-scan reading of the original to produce a varying video signal. The video signal is rendered suitable for writing in a high speed writer by continuously convolving (weighting, multiplying) said signal with stored halftone dot data (attenuation) signals obtained from a Read Only Memory, and applying the resultant treated signals, through a quantizer, to control a beam of radiation to expose a sensitive printing or recording medium to a halftone image pattern in which each dot is configured to provide optimum image information transfer to the reproduction medium. Simulations of the effects of conventional "bump" and "flash" exposures, and of other screenmodifying parameters, can be introduced as desired, and suitable apparatus combinations for performing all these operations are disclosed.

12 Claims, 5 Drawing Figures

SEQUENTIAL IMAGE-MODULATED DOT-AREA RECORDING

BACKGROUND OF THE INVENTION

The invention has to do with graphic arts of the kind which conventionally employ halftone reproduction methods, generally of the photoengraving type, usually heretofore utilizing physical "screens" in combination with suitable camera equipment, special optical stops, diaphragms and the like, to break up continuous tone original subject matter, photographs or other art work and provide photographic reproductions having a dot structure from which printing plates, for color or monochrome, can be fashioned. A considerable degree of camera work artistry is required of the operator as well as a great deal of opto-mechanical expertise and processing labor, in order to produce half-tone negatives (or positives) which retain the sharpness, information content, and other desired properties of the original subject matter.

It has already been proposed to generate halftones by "electronic" means, the approaches being generally similar to those described in the following publications:

"Electronically Generated Halftones," R. J. Klensch et al., RCA Review, September, 1970, pp. 517–533.

"Electronic Halftones," R. Hallows et al., IEEE Spectrum, October, 1968, pp. 64–72.

U.S. Pat. No. 3,646,262, issued Feb. 29, 1972. However, these and similar prior proposals have not proved to be wholly satisfactory as to quality, cost and convenience.

SUMMARY OF THE INVENTION

The present invention aims to eliminate all camera and photographic technique and technology from the making of screened halftone reproductions or printing plates, and to substitute electronic circuitry and associated opto-mechanical methods for all of the optical and photographic components, whereby to achieve a much greater degree of control over the various relevant parameters, and to facilitate the making of such adjustments as may be desired in the pictorial qualities of halftone reproductions made from the continuous tone originals. An important object of the invention is to utilize well known electronic circuitry for the stated purposes; more particularly, to use a low-cost Read Only Memory (ROM) component to synthesize each and every individual halftone dot so that it will be of optimum shape and size, and will recur at proper intervals to simulate a completely "screened" reproduction. Likewise, it is an object of the invention to provide compact and low-cost electronic circuitry for accomplishing auxiliary camera functions, such as those simulating bump and flash exposures and, where desired, through electronic coordinate conversion, to accomplish such screen rotation effects as are required to yield plural plates or reproductions for multi-color printing. The invention may be used with a facsimile type of scanner apparatus such as that shown in my U.S. Pat. No. 3,816,659, issued June 11, 1974.

DESCRIPTION OF THE PREFERRED EMBODIMENT

Before commencing a description of the invention, it would be well to emphasize that the high intensity beam scan is not necessarily utilized to make a finer halftone screen than those of the prior art. The ultimate product of the invention is a halftone reproduction which has a screen ruling at least as fine as is conventional; i.e., perhaps a 65-line screen for newspaper work, up to perhaps a 150-line screen for magazine reproduction, and sometimes even finer screens for art illustrations or books. The fineness and other parameters of the screen ruling required for the halftone reproduction are established mainly by the image detail which must be reproduced, by the printing process to be employed, by the inks, and most especially by the characteristics of the paper on which the printing is to be done. The great improvement in operation which the invention permits results from an extremely good control of the relevant imaging parameters, without any sacrifice in speed of production of the simulated halftone reproduction which is the ultimate product. It is, of course, also important that the said ultimate product may be an actual printing plate and not merely a screened reproduction of the original on photosensitive material, although this, too, is contemplated by the invention.

Figure 1:
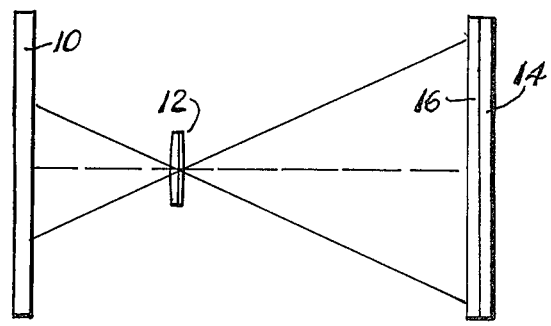
FIG. 1 is a highly schematic illustration of one known prior art system of providing halftone reproductions as by a camera.

Referring first to FIG. 1 of the drawings, reference numeral 10 designates a properly illuminated object, such as original artwork, from which a halftoned reproduction is desired; 12 designates the lens of a conventional process camera (other details of which are omitted) imaging the original object 10 on a sheet of sensitized material 14. Numeral 16 shows in location a conventional halftone screen whose pattern will be imparted to the photographic image being transferred to the reproduction material 14.

It is obvious, firstly, that screen 16 has to be at least as large as the reproduction, so that the fabrication of such a screen becomes expensive, and its use poses storage and handling problems if the reproductions to be made are of any great size or variety. Moreover, as any textbook on modern process photoengraving will testify, the choice of the proper exposure, aperture stop, and so on requires considerable expertise on the part of the cameraman. Still further, experience has shown that optimum reproduction of both highlights, middle tones and shadow areas of the original subject usually requires, in addition to the proper image exposure through screen 16, a so-called flash or non-image exposure made only through screen 16 to ensure the recording of at least a minimum dot structure even in shadow areas of the subject; and finally, most subjects require the equivalent of a bump or no-screen exposure, to maintain highlight tone separation, thereby improving the information content of the reproduction. The present invention provides purely electronic means for simplifying all of these operations, and for minimizing activity on the part of the operator.

Figure 2:
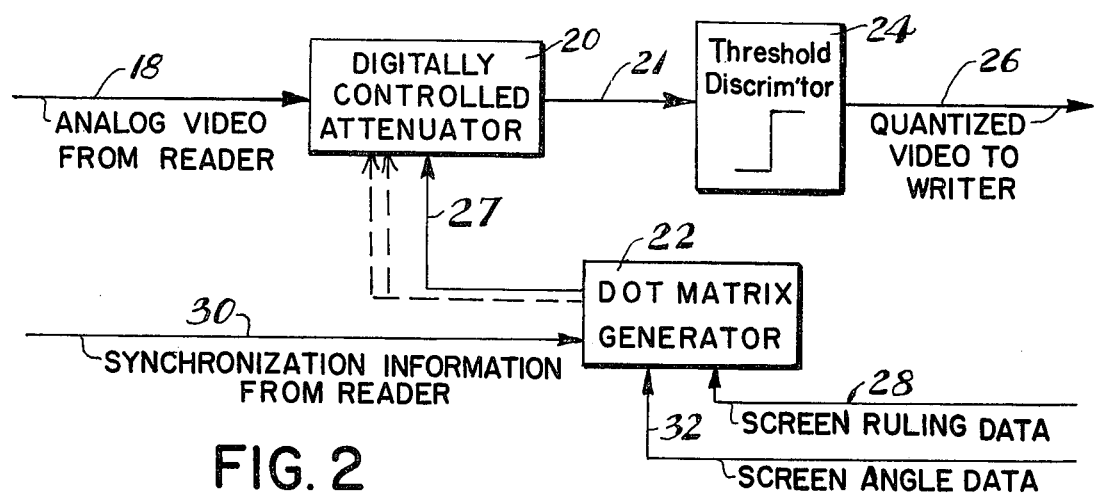
FIG. 2 is an abbreviated schematic diagram illustrating the principle of the present invention.
Figure 4:
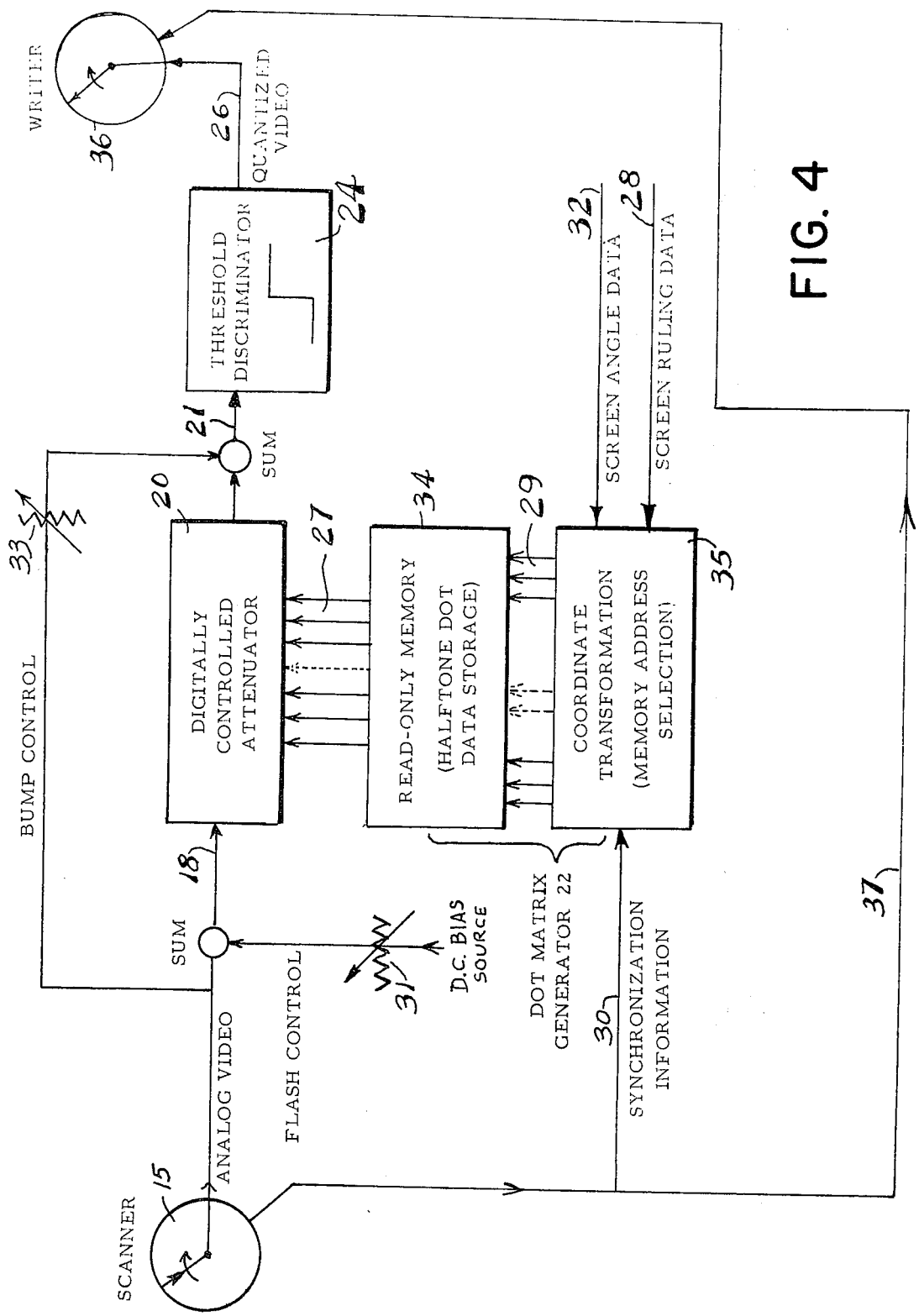
FIG. 4 is a detailed schematic diagram illustrating the major components of the inventive system.

Turning now to FIG. 2 of the drawings, the progress of signals through the apparatus is indicated: the line 18 marked "analog video from reader" is to be understood as carrying a more or less continuous signal resulting from a high-speed scansion of the original artwork or picture, to be thought of most conveniently as wrapped on the inner surface of a drum in scanner 15 (FIG. 4). This scan may typically exhibit a line-to-line separation of the order of 0.001 inch, or one thousand lines per inch for a known rectilinear scan reader-writer (U.S. Pat. No. 3,816,659) although the present invention is not directly concerned with details of the scanning mechanism or process. In any event, as shown in FIG. 2, the signals on line 18 proceed to a digitally-controlled attenuator 20, wherein they are weighted (convolved) with halftone screening signals furnished by a dot matrix generator 22. The dot matrix generator is supplied, over line 30, with X and Y axis synchronization signals from the high speed reading scanner referred to previously, as well as with screen ruling data and screen angle data supplied over lines 28 and 32 respectively, and the resulting digitally attenuated signals then proceed on line 21 to a threshold discriminator or quantizer 24, from which the quantized video is fed, over output line 26, to the modulator of a synchronized high-speed image writing scanner.

Figure 3:
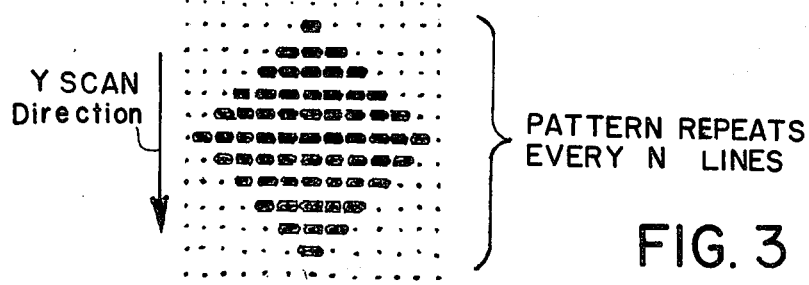
FIG. 3 is a pattern diagram illustrating how a single halftone dot corresponding to a given analog video signal amplitude is formed by the controlled application to the recording medium of successive scans of a beam of radiation, such as a laser. The modulated scan lines form both the columns and the rows of the resulting halftone dots.

The dot matrix generator 22 is comprised of a series of digital counters which perform X and Y scan coordinate transformations within element 35 (FIG. 4) based upon operator-selected screen ruling data received on line 28 and screen angle data received on line 32, and upon video synchronization information received on line 30. The counters provide the parallel digital memory address selection signals, on lines 29, to the Read-Only Memory 34 (such as a 1024 bit bipolar programmable Read Only Memory, Model 82S26, available from Signetics, Sunnyvale, CA 94086) in which positional identification data for every element within a matrix representing a particular halftone dot density profile has been pre-programmed and stored. Matrix generator 22 operates on digitally-controlled attenuator 20, via lines 27, to modify the characteristics of the instantaneous analog video signal received on line 18 by applying to it discrete time rate and amplitude functions. These functions characterize each dot imaging scan element within an NxM matrix of scan elements which, when combined (see FIG. 3), constitute any one of the individual halftone dots generated on the recording medium by writing scanner 36, thereby enabling precise control of the location, shape and area of each and every halftone dot element within the reconstructed and recorded image to be obtained.

The digitally controlled attenuator 20 of FIG. 4 may take any of several well-known forms, such as that shown in Wulfsberg U.S. Pat. No. 3,802,815 of Aug. 20, 1957, in which the input signal is represented by a battery, and the output signal, after attenuation in accordance with the coefficients of the various polynomial orders, is applied to a meter, or alternatively to a summing resistor. In the present invention, of course, and as shown in FIG. 4, the output signal after attenuation, is applied to a summing point at which it is added to the "bump control" signal that has been attenuated at control 33 (which may be manually adjusted), and a similarly adjusted "flash control" signal is provided by a D.C. bias voltage through attenuator 31 to another summing point ahead of the input 18 to the digitally controlled attenuator 20.

It is important to realize that, at the present state of development of the data processing arts, and perhaps with special application to graphic arts data processing, it is largely immaterial whether, at any distinct stage of the procedures, the signal or signals being processed is (or are) in analog form or digital form, and if the latter, whether in time-serial (or space-serial, for that matter), or in parallel form. This is because the conversion from one form to another is so readily, and so speedily, accomplished.

Still referring to FIG. 4 of the drawings, and as already mentioned, line 30 conveys synchronization information to the dot matrix generator 22. A branch circuit 37 extends the same synch information forward to the writer 36. Something more needs to be said, however, about the contents of box 35, respecting scan coordinate transformation. Among other functions, this component accepts the "data" over lines 28 and 32, but these may indeed be merely adjustments of manual controls by which the human operator selects the particular screen angle for one color printer, and the screen ruling (i.e., fineness). The coordinate transformation function includes a transformation to achieve the effect of screen rotation, just as described for example in Mathews and McDonald U.S. Pat. No. 3,422,419 (issued Jan. 14, 1969), especially in column 13 thereof. The transformation described in that patent is essentially a trigonometric one implemented by applying appropriate currents to cathode ray tube deflection coils (see especially FIGS. 9, 11 and 12 of the patent). However, the application to a rectangular scanning system and the use of the synchronization signals to perform the coordinate transformation as in the present case, is in itself an obvious variation, apart from the novel combination herein claimed.

The term "rate" as employed herein is to be understood in its modern context as signifying either a time-rate (as so many or so much per second), or a space-rate (as so much or so many per centimeter), the essential sameness of these concepts being well-recognized today as merely a matter of mathematical choice or definition. By the same token, such nomenclature as "spatial frequency" is to be thought of as including rates expressed "per inch" or "per centimeter", as well as the perhaps more conventional "rates per second". All such are but variations in viewpoint, though it is true that one or the other viewpoint may turn out to be more convenient for operational purposes; as for example those viewpoints which speak of electrical analysis of filters in terms of a "time domain" instead of a more ordinary "frequency domain".

Figure 5:
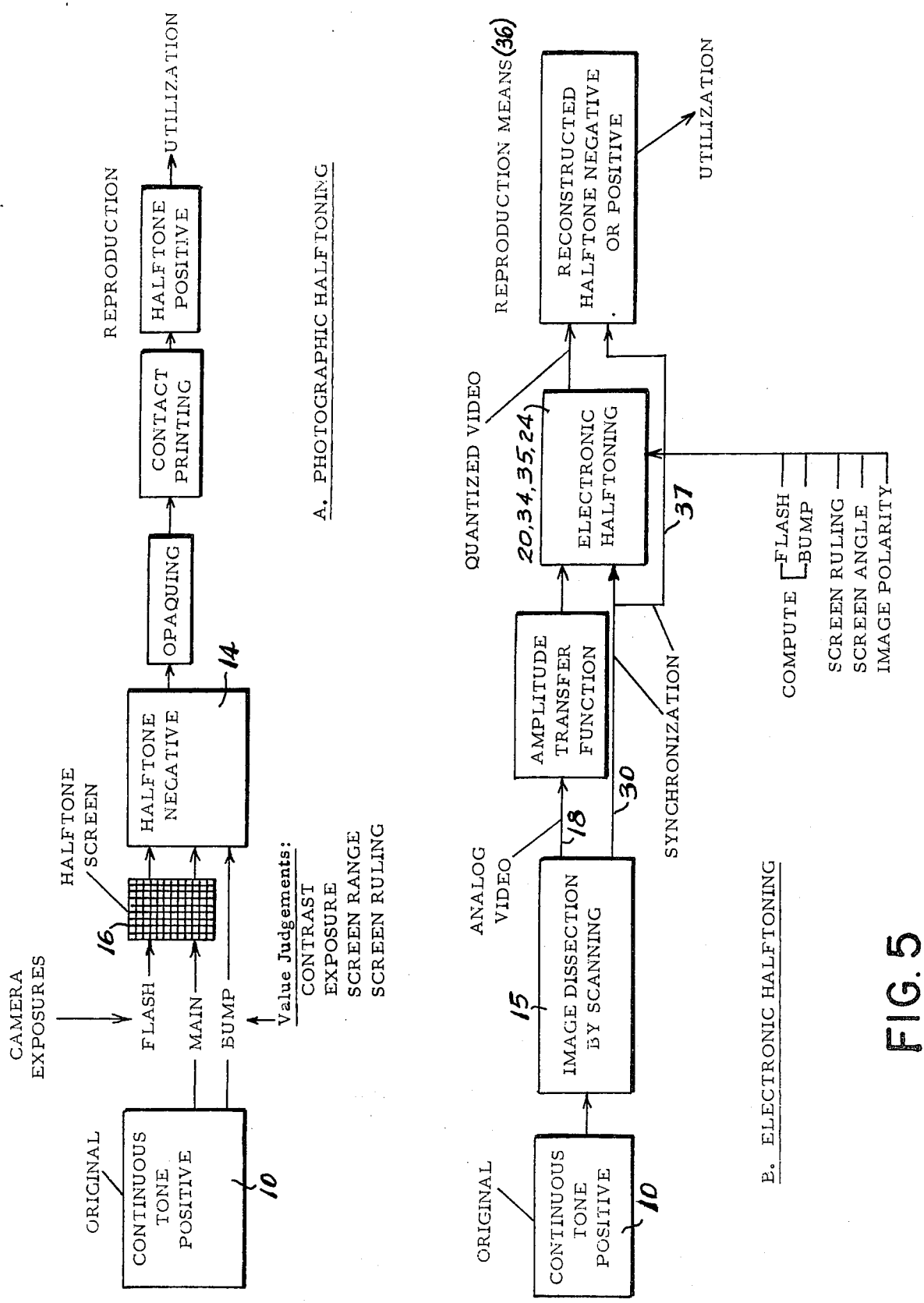
FIG. 5 is an abbreviated schematic diagram comparing the major reproduction steps in (a) conventional photographic and (b) electronic halftoning, procedures.

FIG. 5 of the drawings is an expansion of a development of parallel flow diagrams designated A and B, provided in order to clarify the parallelism or analogy between conventional photographic halftoning and the present invention (electronic halftoning), like reference numerals being applied as in the earlier Figures.

For those applications which require specialized non-linear relationships between the video signal and the resultant halftone image information stored in the read only memory (ROM), an additional non-linear amplitude transfer function 40 can be inserted as shown in FIG. 5 between the image dissection element 15 and the Electronic Halftone Generator comprising blocks 20, 34, 35 and 24. Such devices are well known, as such, as described in Craig et al. U.S. Pat. No. 3,115,807 of Dec. 31, 1963 and Mason U.S. Pat. No. 3,700,329 of Oct. 24, 1972, both owned by the owner of the present case.

It is specifically reiterated that the invention does not have to be "on line" (in modern parlance), but that one or more stages of recording in a memory, such as a magnetic record or a computer, is intended to be included within the true scope and ambit of my invention.

I claim:

1. A method of producing from original continuous tone subject-matter a halftone reproduction made up of dots which in turn are composed of a plurality of dot imaging scan elements, comprising the steps of scanning said subject-matter with a beam of radiation, deriving from said scanning a first signal in the form of a video energy function, repeatedly selecting stored information in accordance with the coordinates of image points of the subject-matter represented by the video energy function to produce a second signal which varies according to the desired dot imaging scan elements of the halftone dots, continuously weighting said first signal with said second signal to produce a resulting convoluted signal, quantizing the resulting colvoluted signal, and applying the quantized signal, in a synchronized scanning mode, to produce the halftone reproduction made up of dots that are comprised of dot imaging scan elements, said scanning proceeding at a rate sufficiently in excess of the desired halftone screen rate to enable production of the aforesaid halftone reproduction.

2. A method in accordance with claim 1, in which said beam of radiation is a laser beam.

3. A method in accordance with claim 1, in which the stored information is contained in a Read Only Memory.

4. A method in accordance with claim 1, in which said quantizing is accomplished by a threshold discriminator.

5. The method of claim 1 in which the selection of stored information is also determined in accordance with the desired screen ruling data so that the resulting halftone reproduction conforms to said desired screen ruling.

6. The method of claim 1 in which the selection of stored information is also determined in accordance with the desired screen angle data so that the resulting halftone reproduction conforms to said desired screen angle.

7. The method of claim 1 in which the selection of stored information is also determined in accordance with the desired screen ruling and angle data so that the resulting halftone reproduction conforms to said desired screen ruling and angle.

8. Apparatus for producing a halftone reproduction of original continuous tone subject-matter, comprising means for scanning said subject-matter with a beam of radiation at a scan rate far in excess of the desired halftone screen rate, means for deriving a video energy function from the output of said scanning means, memory means for storing a plurality of functions respectively representing elementary dot imaging scan elements of a halftone dot, signal producing means synchronized with said first-named means for combining the video energy function with selected functions in the memory means to produce a resulting convoluted signal, and means responsive to the signal producing means and synchronized with the first-named means for producing the desired halftone reproduction which is made up of dots comprised of dot imaging scan elements.

9. Apparatus in accordance with claim 8, in which said memory means is a Read Only Memory.

10. Apparatus according to claim 8 in which the fourth-named means includes means for varying the screen ruling.

11. Apparatus according to claim 8 in which the fourth-named means includes means for varying the screen angle.

12. Apparatus according to claim 8 in which the fourth-named means includes means for varying both the screen ruling and the screen angle.

* * * * *